US008688102B2

(12) United States Patent
Robins

(10) Patent No.: US 8,688,102 B2
(45) Date of Patent: Apr. 1, 2014

(54) METHOD AND CONFIGURING PARAMETERS OF GPRS-TYPE COMMUNICATION DEVICES OVER A CELLULAR PHONE NETWORK, AND CORRESPONDING COMMUNICATIONS SYSTEM

(75) Inventor: Mark Robins, Ipswich (GB)

(73) Assignee: Itron, Inc., Liberty Lake, WA (US)

( * ) Notice: Subject to any disclaimer, the term of this patent is extended or adjusted under 35 U.S.C. 154(b) by 818 days.

(21) Appl. No.: 11/784,929

(22) Filed: Apr. 10, 2007

(65) Prior Publication Data

US 2007/0249362 A1    Oct. 25, 2007

(30) Foreign Application Priority Data

Apr. 19, 2006 (GB) .................................. 0607723.4

(51) Int. Cl.
*H04M 3/00* (2006.01)

(52) U.S. Cl.
USPC ... 455/419; 455/418; 379/93.01; 379/106.03; 340/870.01; 340/870.02; 324/110; 324/114; 702/61

(58) Field of Classification Search
USPC .................. 455/419, 414; 379/93.01, 106.03; 340/870.01–870.44; 324/110, 114; 702/61
See application file for complete search history.

(56) References Cited

U.S. PATENT DOCUMENTS

| | | | |
|---|---|---|---|
| 5,748,104 A | 5/1998 | Argyroudis et al. | |
| 5,852,658 A | 12/1998 | Knight et al. | |
| 6,819,098 B2 | 11/2004 | Villicana et al. | |
| 7,027,808 B2 * | 4/2006 | Wesby | 455/419 |
| 7,200,390 B1 * | 4/2007 | Henager et al. | 455/419 |
| 7,769,149 B2 * | 8/2010 | Berkman | 379/93.01 |
| 2004/0259533 A1 | 12/2004 | Nixon et al. | 455/414.1 |
| 2005/0117554 A1 | 6/2005 | Bleckert et al. | 370/338 |
| 2005/0141438 A1 | 6/2005 | Quetglas et al. | 370/254 |
| 2005/0276233 A1 | 12/2005 | Shepard et al. | 455/426.2 |
| 2006/0023853 A1 * | 2/2006 | Shelley et al. | 379/106.03 |
| 2006/0079254 A1 | 4/2006 | Hogan | 455/466 |
| 2006/0082468 A1 * | 4/2006 | Wang et al. | 340/870.02 |
| 2007/0057814 A1 * | 3/2007 | Goldberg et al. | 340/870.02 |

FOREIGN PATENT DOCUMENTS

| | | |
|---|---|---|
| DE | 10133366 | 1/2003 |
| DE | 20023656 | 7/2005 |
| DE | 69730950 | 10/2005 |
| EP | 1613048 | 1/2006 |

(Continued)

OTHER PUBLICATIONS

Search Report dated Jul. 21, 2006.

(Continued)

*Primary Examiner* — Dwayne Bost
*Assistant Examiner* — Gerald Johnson
(74) *Attorney, Agent, or Firm* — Dority & Manning, P.A.

(57) ABSTRACT

A method for remotely configuring parameters of GPRS-type communication devices (2, 3) within a communications system in which data are exchanged between said GPRS-type communication devices (2, 3) and a central communications system (1) over a cellular phone network (6). According to the invention, configuration parameters (Pn) are first set and then stored in a configuration instruction queue (10) of said central communications system (1). Upon initiation of a communication using the GPRS protocol from a transmitting GPRS-type communication device (Idm), corresponding configuration parameters, provided that they are stored in queue, are then sent to said transmitting GPRS-type device (Idm) using GPRS protocol. The method is applicable to remote configuration of utility metering data over a GSM type network.

7 Claims, 2 Drawing Sheets

(56) References Cited

FOREIGN PATENT DOCUMENTS

| | | | |
|---|---|---|---|
| GB | 2374760 | 4/2001 | ............ G08C 17/02 |
| GB | 2374760 | 10/2002 | |
| GB | 2386503 | 9/2003 | |
| GB | 2403043 | 6/2004 | ........... G06F 15/177 |
| GB | 2403043 | 12/2004 | |
| WO | 03096724 | 11/2003 | ............... H04Q 7/32 |
| WO | WO 03/096724 | 11/2003 | |
| WO | WO 2004/027676 | 4/2004 | |
| WO | 2004073332 | 8/2004 | ............... H04Q 7/22 |
| WO | WO 2004/073332 | 8/2004 | |
| WO | WO 2006/000033 | 1/2006 | |

OTHER PUBLICATIONS

International Search Report—Jul. 4, 2008.
Machine translation of abstract of DE 1013366 above.
Machine translation of abstract of DE 20023656 above.
Machine translation of abstract and cover page of WO9732439 corresponding to DE 69730950 above.

* cited by examiner

METHOD AND CONFIGURING PARAMETERS OF GPRS-TYPE COMMUNICATION DEVICES OVER A CELLULAR PHONE NETWORK, AND CORRESPONDING COMMUNICATIONS SYSTEM

RELATED APPLICATION

This application is related to and claims the benefit of priority from United Kingdom Patent Application No. 0607723.4, filed on Apr. 19, 2006, the entirety of which is incorporated by reference.

FIELD OF THE INVENTION

The present invention relates to a method for remotely configuring parameters of any communication device able to communicate over a cellular phone network, for instance over a GSM network, via a GPRS-type interface.

The invention will be described in the particular field of utility metering devices, but can be clearly used in other domains.

BACKGROUND

Recently, some communications systems have been developed which enable exchanges of data between a central system and several utility meter devices by using a GSM network. These systems are generally used to remotely collect data from a large number of utility meters, on a periodic basis, mainly in order to calculate a user's energy consumption (electricity, water or gas), and consequently to be able to bill the user according to his energy consumption.

In order to exchange a large amount of data with minimum communication costs, some of these known systems have communications based on GPRS (acronym for General Packet Radio System) protocol, utility meters being fitted with GPRS communication interface. Some of these communications systems also enable the remote configuration of parameters of these GSM-enabled meters.

Indeed, it may be required to provide to a large number of utility meters with new configuration parameters.

These parameters can be linked to a new tariff programme, i.e. a detailed switching schedule that the meter uses to determine the correct rate registers to record energy consumption against.

Alternatively or in combination, these parameters can be general communication parameters, e.g.:
  Times when the meter is allowed to initiate communications with the central system;
  Frequency of communication for emergency calls;
  Protocol for determining when to initiate communications with the central system;
  IP address of central system;
  GPRS network parameters.

Alternatively or in combination, these parameters can be time parameters (Current time and date, time zone, daylight saving time configuration).

Alternatively or in combination, these parameters can be data storage parameters, e.g.:
  Minimum power failure length recorded;
  Number of load profile registers to store;
  Number of billing registers to store.

Alternatively or in combination, these parameters can be remote firmware download or remote control parameters, e.g.:
  Direct control of relays connected to the meter;
  Schedule for controlling relays connected to the meter;
  Programme for controlling relays connected to the meter based on other parameters;
  Disconnection and reconnection of supply;
  Perform self test;
  Perform a full reset;
  Meter display configuration.
  Instruction and parameters to download new firmware.

Remote configuration of meters is performed in current systems by sending configuration data to the meter either on request of an operator, or scheduled at a particular time. However, GPRS communications must be initiated by a GPRS modem, and so current systems use a different communications bearer such as GSM data or SMS to send configuration data to GSM-enabled meters, which is more expensive than using GPRS.

OBJECT AND SUMMARY

An aim of the invention is to remedy the above drawback by enabling remote configuration of GPRS-type enabled communication devices, in particular GPRS-enabled utility meters, thus reducing communication costs.

To this aim, an aspect of the present invention is a method for remotely configuring parameters of GPRS-type communication devices within a communications system in which data are exchanged between said GPRS-type communication devices and a central communications system over a cellular phone network, characterized in that it comprises the following steps:
  Setting configuration parameters linked to at least one of said GPRS-type communication devices and storing said configuration parameters in a configuration instruction queue of said central communications system;
  Upon initiation of a communication using the GPRS protocol from any transmitting GPRS-type communication device, receiving at said central communications system data from said transmitting GPRS-type communication device;
  In case configuration parameters linked to said transmitting GPRS-type device have been stored in said queue, sending said configuration parameters to said transmitting GPRS-type device using said GPRS protocol.

Said step of sending configuration parameters preferably consists of or includes sending an acknowledgement message to said transmitting GPRS-type communication device for acknowledging receipt of said data, said configuration parameters being attached to said acknowledgment message.

Advantageously, stored configuration parameters may be marked with information defining a validity period during which they can be sent to corresponding GPRS-type communication device.

In this case, the method can further comprise a step of checking whether the current date and time is within said validity period, said step of sending configuration parameters being performed only if said validity period has not expired yet.

In possible embodiments, the method may further comprise a step of sending an acknowledgment message back to said central communications system upon reception of said configuration parameters.

The step of setting configuration parameters may comprise sub-steps of entering or generating configuration parameters remotely from said central communications system, and downloading them into said queue.

A second aspect of the invention is a communications system in which data are exchanged between GPRS-type communication devices and a central communications system over a cellular phone network, characterized in that said central communications system comprises:

- a configuration instruction queue for storing configuration parameters linked to at least one of said GPRS-type communication devices;
- means for receiving data sent from a transmitting GPRS-type communication device upon communication initiated by said transmitting GPRS-type communication device using the GPRS protocol;
- In case configuration parameters linked to said transmitting GPRS-type device have been stored in said queue, means for sending said configuration parameters to said transmitting GPRS-type device using the GPRS protocol.

Said communications system may further comprises an electronic configuration generator separate from said central communications system for generating said configuration parameters, and, in this case, said central communications system further comprises a system programming interface for receiving configuration parameters downloaded from said generator.

The communications system can perform the method of the previous aspect. Thus optional features of the method find corresponding optional features in the communications system.

BRIEF DESCRIPTION OF THE DRAWINGS

Features and advantages of the invention will become apparent from the following description of the invention given by way of non-limiting examples only and with reference to the accompanying drawings, in which.

DETAILED DESCRIPTION

Figure 1:
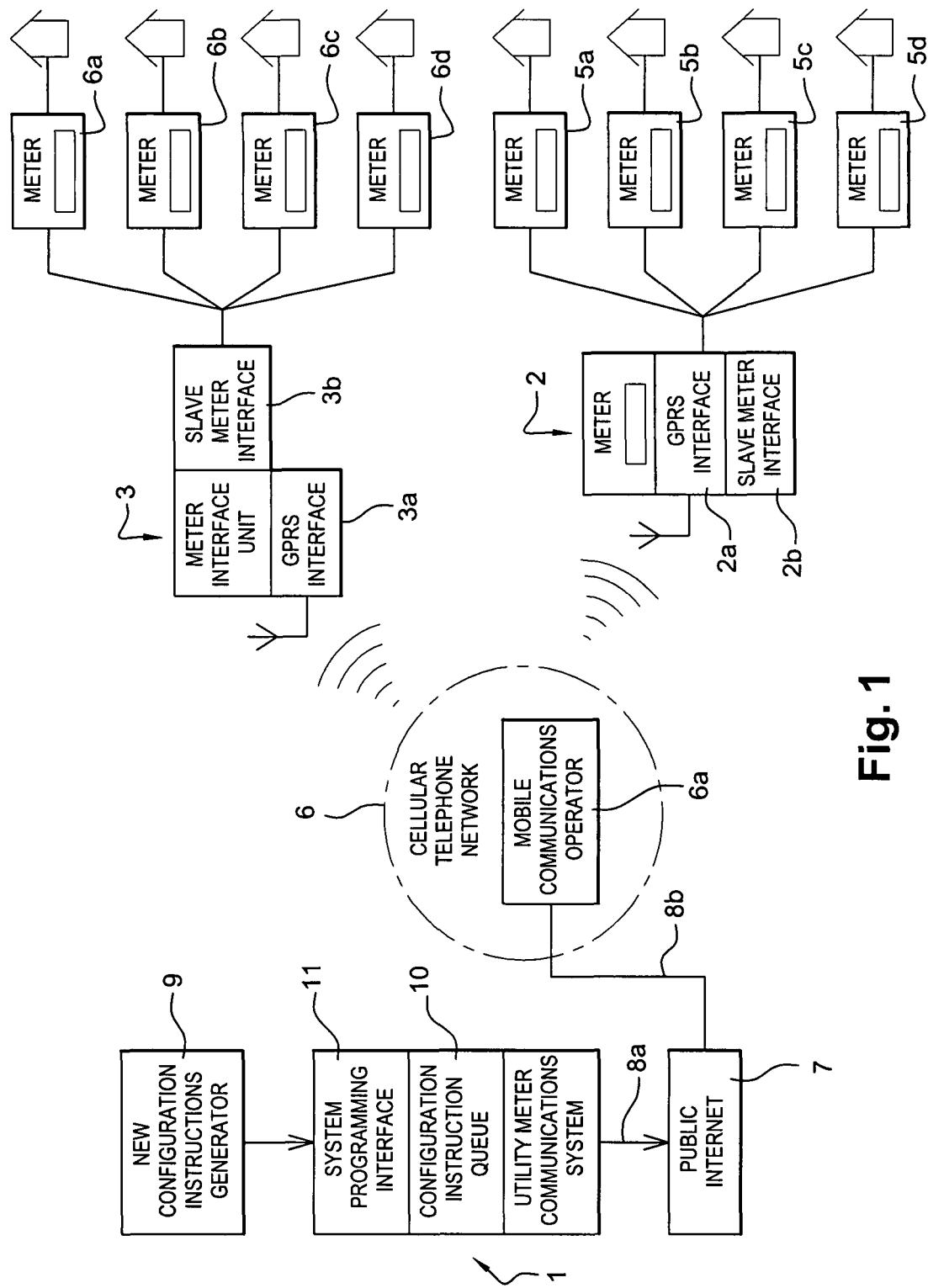
FIG. 1 shows a simplified block diagram illustrating communication of data in a utility meter communications system according to a preferred embodiment of the invention.

FIG. 1 shows schematically a global architecture of a communications system enabling exchanges of communication packet data between a central utility meter communications system 1 and several communication devices 2, 3. In the described example, communications are performed over GPRS, but other kinds of communication through packet data may be used.

Communication device may be a utility meter device 2 with a built-in GPRS interface 2a for enabling GPRS communication. Utility meter device 2 may constitute a master device, linked to several slave utility meters 5a to 5d through a slave meter interface 2b.

Alternatively, communication device may be a utility meter interface unit 3 with a built-in GPRS interface 3a, which is linked to one or more slave utility meter devices 6a to 6d, through a slave meter interface 3b.

Exchanges of data between central communication system 1 and communication devices 2 or 3 are performed over the air through a cellular telephone network 6, for instance a GSM network, using the GPRS protocol. Between cellular telephone network 6 and GPRS-type communication devices 2, 3, communications are performed via wireless links. Between central communication system 1 and cellular telephone network 6, communications are performed over public internet 7 via TCP/IP links 8a, 8b through a mobile communication operator 6a of cellular network 6.

A method for asynchronous configuration of GPRS-enables utility meter device 2 or utility meter interface unit 3 according to the invention will now be described in reference with FIG. 2:

Typically, central communications system 1 waits for any of utility meter devices 2, 3 to initiate communication, and then sends, if necessary, configuration data together with acknowledgement of data sent by utility meter.

This means that central communication system 1 must generally be able:

- first to queue new configuration parameters linked to at least one utility meter;
- upon initiation of a communication by any utility meter within the communications system, to check whether some configuration parameters relating to this particular utility meter have been queued, and to send them if need be to the utility meter, preferably attached to an acknowledgement message used for acknowledging receipt of data from said utility meter.

Accordingly, a first step A0 of the method consists in setting or at least storing, at the central system's side, new configuration parameters or instructions for a given meter which might be at any time in communication with said system through cellular network 6. In FIG. 2, it is assumed that configuration instructions Pn have been defined for a meter with identifier IDn.

New configuration parameters or instructions for any metering device 2, 3 are preferably manually entered by a user or generated by an electronic configuration instructions generator 9 separate from central system 1. In this case, they are then downloaded into a configuration instruction queue 10 of central system 1 through a system programming interface 11. Each instruction is indexed with the identification ID of the device for which it is destined.

Instructions corresponding to a given GPRS-type communication device are stored in queue 10 until said device initiates a communication.

Each instruction can advantageously be also marked with a start date and time and end date and time, which define a validity period TVALID during which the instruction can be used. This avoids sending configuration instructions which would have expired. If an instruction is not sent before the end date and time occurs, then this can be used to raise an alarm that the system has failed to deliver the instruction. This also enables configuration instructions to be configured in advance of them being required.

Figure 2:
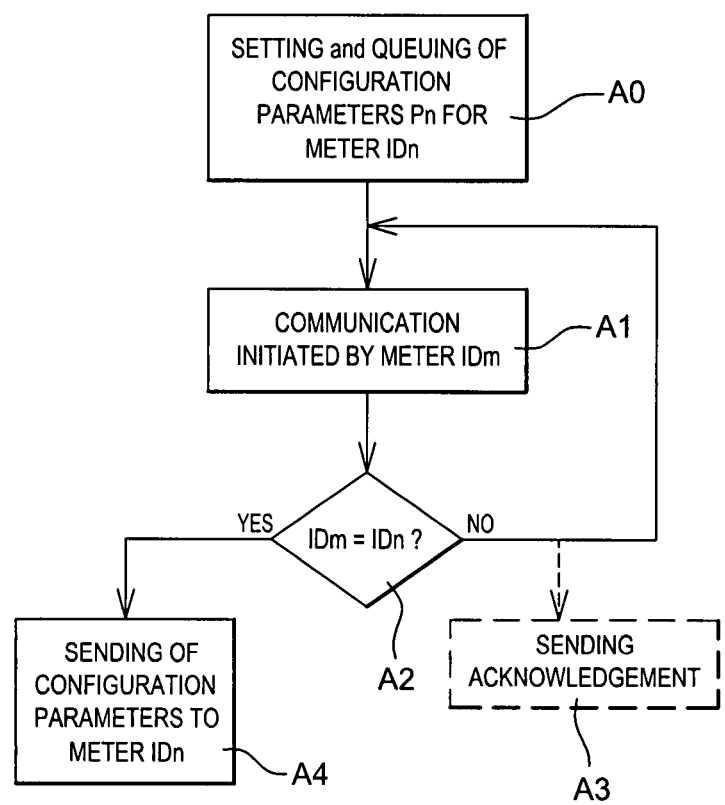
FIG. 2 shows different steps involved in the method according to the invention.

Communication with utility meter device 2 or utility meter interface unit 3 is initiated by the device or unit itself through its GPRS Interface 2a, 3a (step A1 of FIG. 2 where it is assumed that meter with identifier IDm initiates a communication). Communication with a slave meter 5a to 5d or 6a to 6d is performed on behalf of the slave by meter device 2 or Meter Interface Unit 3 to which the slave is connected through its stave meter interface 2b, 3b.

In any case, GPRS communication device 2, 3 may initiate communication to the utility meter communications System 1 for any arbitrary reason. This normally occurs periodically, e.g. daily, when devices send metering data to utility meter communications system 1. Whatever the reason, data linked to this communication are sent using TCP/IP protocols. These data are then routed over GPRS from GPRS interface 2a or 3a through cellular telephone network 6. Mobile communications operator 6a provides a TCP/IP connection 8b from cellular telephone network 6 through to public internet 7.

Utility meter communications system 1 is connected to public internet through a public internet service provider, providing direct TCP/IP access 8a.

When utility meter communication system 1 receives data from a meter IDm, a subsequent step A2 is performed in which system 1 searches configuration instruction queue 10 for any corresponding configuration instructions or parameters. To this aim, system 1 will first extract from received data the identifier ID corresponding to transmitting device, and then search in queue 11 for instructions that are indexed with the same device identifier. Step A2 is schematically shown on FIG. 2 as a comparison of identifier IDm linked to transmitting meter, with identifier IDn linked to configuration instructions Pn stored in queue 10.

If nothing relating to transmitting meter IDm can be found in queue 10, then system 1 waits again until it receives data linked to another communication. Optionally, it may send an acknowledgement message via GPRS as shown on step A3 to transmitting meter, in order to acknowledge receipt of data.

If queue 10 contains configuration instructions relating to the transmitting meter (namely if IDm=IDn), then these instructions are sent to the transmitting meter, preferably attached to an acknowledge message using GPRS.

In case instructions have also been marked with information defining a validity period, it is also checked whether the current date and time is within said validity period (not shown), and step A4 is performed only if validity period has not expired yet.

Although this is not shown on FIG. 2, once the meter has received the configuration instructions, it may then send an acknowledgement message back to utility meter communication system 1 using the same technique. When system 1 receives this acknowledgement message, it may then mark the configuration instructions as sent. If, after a long delay, system 1 receives another communication from the device without having received an acknowledgement, it will resend the configuration instructions according to the same method, providing there are still in the validity period.

Thanks to the method, it is possible to remotely configure or update a large number of meters, with minimal communication overhead to the normal communication needed to send data initiated by the meter, thus minimising communication costs.

The invention claimed is:

1. A method for remotely configuring parameters of utility meters and/or utility meter interface units within a communications system in which metering data are sent from said utility meters and/or utility meter interface units to a central communications system over a cellular phone network using the GPRS protocol, said method comprising the steps of:

setting configuration parameters linked to at least one of said utility meters and/or utility meter interface units and storing said configuration parameters in a configuration instruction queue of said central communications system;

upon initiation of a communication using the GPRS protocol from any transmitting utility meter and/or utility meter interface unit, during which metering data from said transmitting utility meter and/or utility meter interface unit are received at said central communications system, checking if configuration parameters linked to said transmitting utility meter and/or utility meter interface unit have been stored in said queue; and in case configuration parameters linked to said transmitting utility meter and/or utility meter interface unit have been stored in said queue, sending said configuration parameters to said transmitting utility meter and/or utility meter interface unit using the GPRS protocol;

wherein said step of sending configuration parameters includes sending an acknowledgement message to said utility meter and/or utility meter interface unit for acknowledging receipt of said metering data, said configuration parameters being attached to said acknowledgment message.

2. The method according to claim 1, wherein stored configuration parameters are marked with information defining a validity period during which they can be sent to corresponding utility meters and/or utility meter interface units.

3. The method according to claim 2, wherein said method further comprises a step of checking whether the current date and time is within said validity period, said step of sending configuration parameters being performed only if said validity period has not expired yet.

4. A method according to claim 1, wherein said method further comprises a step of sending an acknowledgment message back to said central communications system upon reception of said configuration parameters.

5. A method according to claim 1, wherein said step of setting configuration parameters comprises sub-steps of entering or generating configuration parameters remotely from said central communications system, and downloading them into said queue.

6. A communications system in which metering data are sent from utility meters and/or utility meter interface units to a central communications system over a cellular phone network using the GPRS protocol, said central communications system comprising:

a configuration instruction queue for storing configuration parameters linked to at least one of said utility meters and/or utility meter interface units;

means for receiving metering data sent from a utility meter and/or utility meter interface unit upon a communication initiated by said utility meter and/or utility meter interface unit using the GPRS protocol for transferring metering data; and in case configuration parameters linked to said utility meter and/or utility meter interface unit have been stored in said queue, means for sending said configuration parameters to said utility meter and/or utility meter interface unit using the GPRS protocol;

wherein said means for sending said configuration parameters are configured for sending an acknowledgement message to said utility meter and/or utility meter interface unit for acknowledging receipt of said metering data, with said configuration parameters attached to said acknowledgment message.

7. A communications system according to claim 6, wherein said system further comprises an electronic configuration generator, separate from said central communications system, for generating said configuration parameters, and in that said central communications system further comprises a system programming interface for receiving configuration parameters downloaded from said generator.

* * * * *